United States Patent
Togawa

(10) Patent No.: US 11,954,131 B2
(45) Date of Patent: Apr. 9, 2024

(54) TIME-SERIES DATA PROCESSING METHOD

(71) Applicant: NEC Corporation, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 159 days.

(21) Appl. No.: 17/616,223

(22) PCT Filed: Jun. 6, 2019

(86) PCT No.: PCT/JP2019/022548
§ 371 (c)(1),
(2) Date: Dec. 3, 2021

(87) PCT Pub. No.: WO2020/245980
PCT Pub. Date: Dec. 10, 2020

(65) Prior Publication Data
US 2022/0253461 A1    Aug. 11, 2022

(51) Int. Cl.
*G06F 16/28* (2019.01)

(52) U.S. Cl.
CPC .................. *G06F 16/285* (2019.01)

(58) Field of Classification Search
CPC ............... G06F 16/285; G06F 16/2477; G06F 2201/865; G06F 2201/88; G06F 11/3419; G06F 11/3409; G06F 11/079; G06F 11/0751; G06F 11/0778; G06F 2201/835; G06F 17/18; G06F 11/3058; G06F 11/0754; G05B 23/02; G05B 19/4186
USPC ......................................................... 707/739
See application file for complete search history.

(56) References Cited

U.S. PATENT DOCUMENTS

| 2012/0041575 | A1 | 2/2012 | Maeda et al. |
| 2014/0279795 | A1* | 9/2014 | Shibuya ............. G05B 23/0221 706/46 |
| 2014/0280135 | A1* | 9/2014 | Tsubouchi .......... G06F 16/2477 707/736 |
| 2019/0379589 | A1* | 12/2019 | Ryan ..................... G06F 17/142 |

(Continued)

FOREIGN PATENT DOCUMENTS

| JP | 2010-191556 A | 9/2010 |
| JP | 2018-139085 A | 9/2018 |

(Continued)

OTHER PUBLICATIONS

International Search Report for PCT Application No. PCT/JP2019/022548, dated Aug. 20, 2019.

*Primary Examiner* — Evan Aspinwall

(57) ABSTRACT

A time-series data processing apparatus according to the present invention includes: a generating unit configured to generate a generator having learned so as to generate state information representing a state of time-series data having a predetermined time width in accordance with a label given to the time-series data; a state information generating unit configured to generate, by using the generator, state information representing a state of division time-series data obtained by dividing the time-series data by a shorter time width than the predetermined time width; and a classifying unit configured to classify a plurality of division time-series data based on state information of the plurality of division time-series data.

17 Claims, 14 Drawing Sheets

(56) References Cited

U.S. PATENT DOCUMENTS

2019/0392350 A1 12/2019 Ikeda et al.
2020/0387797 A1* 12/2020 Ryan ..................... G06N 3/084

FOREIGN PATENT DOCUMENTS

JP   2019-049889 A   3/2019
WO  2018/142704 A1  8/2018

* cited by examiner

Fig.7
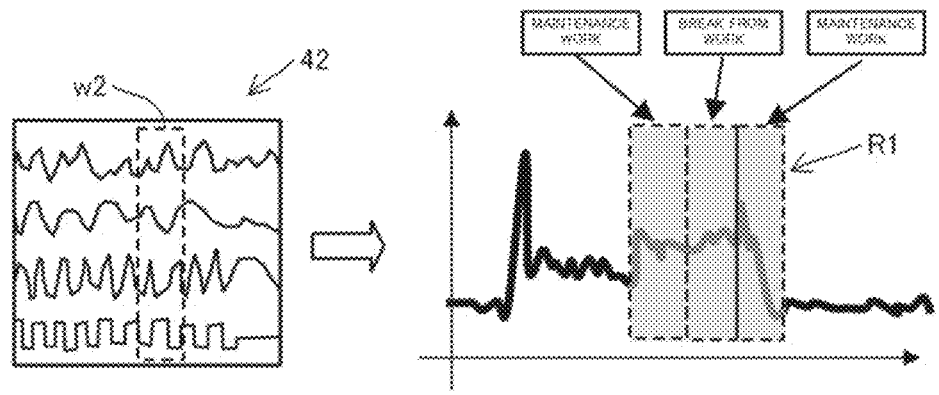
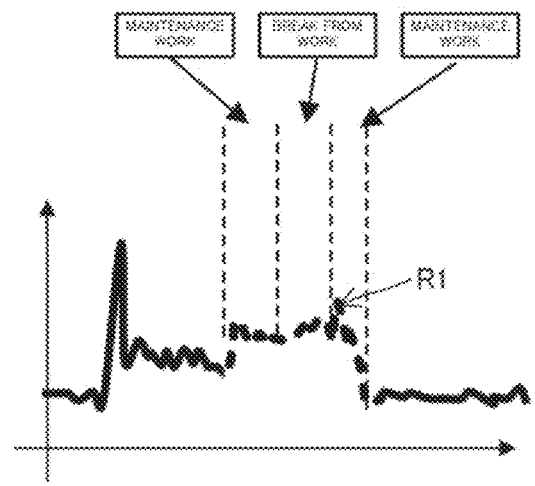
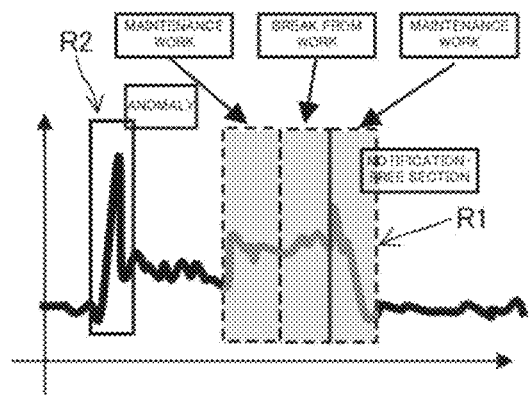

TIME-SERIES DATA PROCESSING METHOD

This application is a National Stage Entry of PCT/JP2019/022548 filed on Jun. 6, 2019, the contents of all of which are incorporated herein by reference, in their entirety.

TECHNICAL FIELD

The present invention relates to a time-series data processing method, a time-series data processing apparatus, and a program.

BACKGROUND ART

In plants such as a manufacturing factory and a processing facility, time-series data that is measured values from various sensors is analyzed, and the occurrence of an anomalous state is detected and output. For example, in Patent Document 1, learning data that is normal measurement data of a plant measured in advance is learned, and an anomaly is detected based on the degree of deviation between newly acquired measurement data and the learning data.

Further, Patent Document 2 describes learning with anomalous measurement data of a plant as a truth label and predicting an anomaly. With such a technique, it is possible to predict the content of an anomalous state that may occur in a plant by previously performing machine learning with various anomalous measurement data of the plant as truth labels.

Patent Document 1: Japanese Unexamined Patent Application Publication No. JP-A 2010-191556
Patent Document 2: Japanese Unexamined Patent Application Publication No. JP-A 2018-139085

However, a label representing what kind of anomalous state anomalous measurement data represents is given by a person and the degree of freedom of the content of the label is high, so that there is a problem in the accuracy thereof. That is to say, there arises a problem that the accuracy of state prediction lowers when the content of a label given to measurement data in advance is different from the actual state of a monitoring target.

SUMMARY

Accordingly, an object of the present invention is to solve the abovementioned problem that the accuracy of state prediction on a monitoring target lowers.

A time-series data processing method according to an aspect of the present invention includes: generating a generator having learned so as to generate state information representing a state of time-series data having a predetermined time width in accordance with a label given to the time-series data; generating, by using the generator, state information representing a state of division time-series data obtained by dividing the time-series data by a shorter time width than the predetermined time width; and classifying a plurality of division time-series data based on state information of the plurality of division time-series data.

Further, a time-series data processing apparatus according to an aspect of the present invention includes: a generating unit configured to generate a generator having learned so as to generate state information representing a state of time-series data having a predetermined time width in accordance with a label given to the time-series data; a state information generating unit configured to generate, by using the generator, state information representing a state of division time-series data obtained by dividing the time-series data by a shorter time width than the predetermined time width; and a classifying unit configured to classify a plurality of division time-series data based on state information of the plurality of division time-series data.

Further, a program according to an aspect of the present invention has a program recorded thereon. The program includes instructions for causing an information processing apparatus to realize: a generating unit configured to generate a generator having learned so as to generate state information representing a state of time-series data having a predetermined time width in accordance with a label given to the time-series data; a state information generating unit configured to generate, by using the generator, state information representing a state of division time-series data obtained by dividing the time-series data by a shorter time width than the predetermined time width; and a classifying unit configured to classify a plurality of division time-series data based on state information of the plurality of division time-series data.

With the configurations as described above, the present invention can increase the accuracy of state prediction on a monitoring target.

BRIEF DESCRIPTION OF DRAWINGS

FIG. 7 is a view showing an aspect of time-series data processing by the time-series data processing apparatus disclosed in FIG. 1.

EXAMPLE EMBODIMENTS

First Example Embodiment

Figure 1:
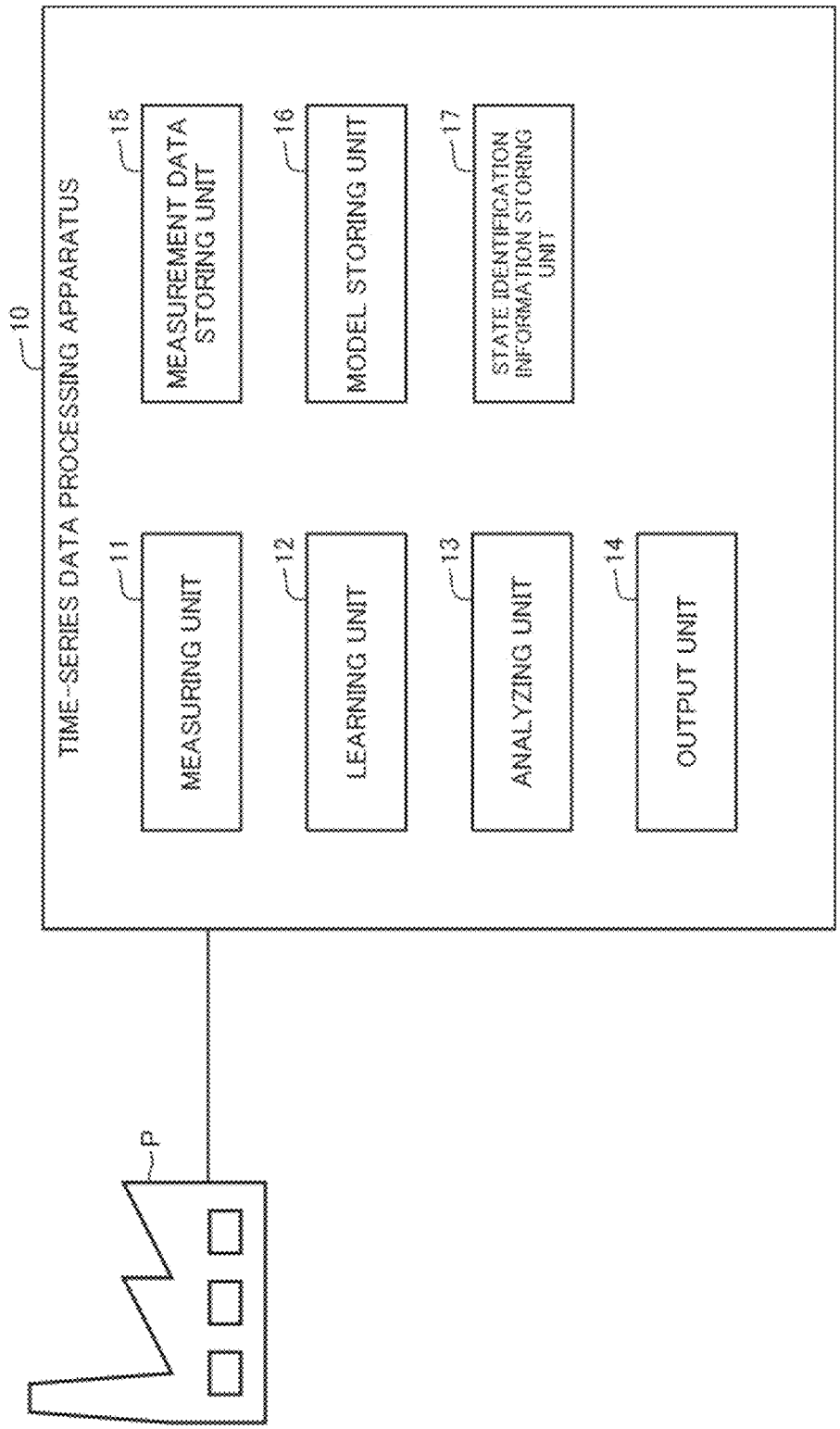
FIG. 1 is a block diagram showing a configuration of a time-series data processing apparatus according to a first example embodiment of the present invention.
Figure 2:
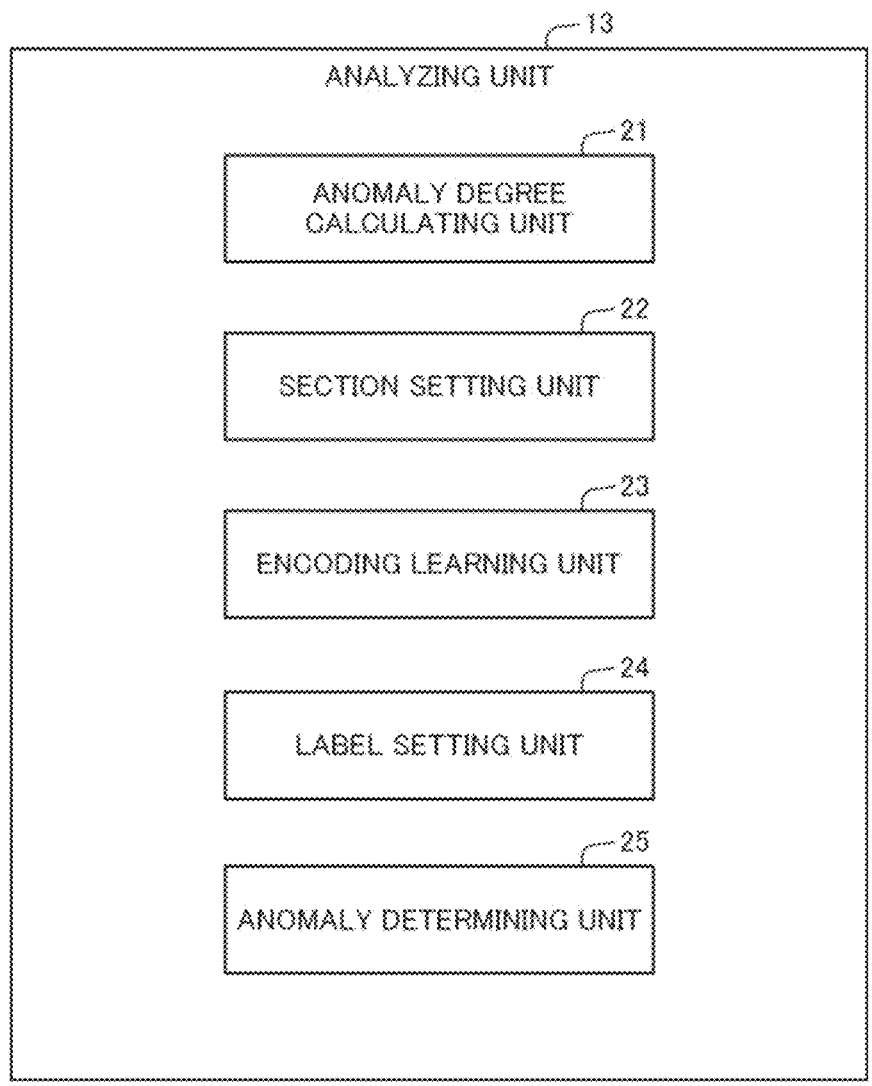
FIG. 2 is a block diagram showing a configuration of an analyzing unit disclosed in FIG. 1.

A first example embodiment of the present invention will be described with reference to FIGS. 1 to 11. FIGS. 1 to 2 are views for describing a configuration of a time-series data processing apparatus, and FIGS. 3 to 11 are views for describing a processing operation of the time-series data processing apparatus.

[Configuration]

A time-series data processing apparatus 10 according to the present invention is connected to a monitoring target (a target) such as a plant. Then, the time-series data processing apparatus 10 is used for acquiring and analyzing the measurement values of elements of the monitoring target P and monitoring the state of the monitoring target P based on the analysis result. For example, the monitoring target P is a plant such as a manufacture factory and a processing facility, and the measurement values of the elements include a plurality of kinds of information such as temperature, pressure, flow rate, power consumption value, supply of raw material, remaining amount, and so on, in the plant. In this example embodiment, it is assumed that the state of the monitoring target P to be monitored is an anomalous state of the monitoring target P, and an anomaly degree calculated based on a preset criterion is output and notification information to notify the anomalous state is output.

However, the monitoring target P according to the present invention is not limited to a plant, and may be anything including a facility such as an information processing system. For example, in a case where the monitoring target P is an information processing system, the state of the information processing system may be monitored by measuring CPU (Central Processing Unit) use rate, memory use rate, disk access frequency, number of input/output packets, power consumption value, and so on, of information processing apparatuses configuring the information processing system as the measurement values of the elements and analyzing the measurement values.

The abovementioned time-series data processing apparatus 10 is composed of one or a plurality of information processing apparatuses each including an arithmetic logic unit and a storage unit. As shown in FIG. 1, the time-series data processing apparatus 10 includes a measuring unit 11, a learning unit 12, an analyzing unit 13, and an output unit 14, which are structured by execution of a program by the arithmetic logic unit. The time-series data processing apparatus 10 also includes a measurement data storing unit 15, a model storing unit 16, and a state identification information storing unit 17, which are formed in the storage unit. Below, the respective components will be described in detail.

The measuring unit 11 acquires the measurement values of the elements measured by various sensors installed in the monitoring target P as time-series data at predetermined time intervals, and stores into the measurement data storing unit 15. Since a plurality of kinds of elements are measured at this time, the measuring unit 11 acquires a time-series data set that is a set of time-series data of a plurality of elements as denoted by reference numeral 41 in FIG. 3. The measuring unit 11 acquires and stores a time-series data set at all times, and the acquired time-series data set is used at the time of generating a correlation model representing a normal state of the monitoring target P, at the time of setting a period requiring no notification of an anomalous state of the monitoring target P and a section label, and at the time of monitoring the state of the monitoring target P, respectively, as will be described later.

The learning unit 12 inputs a time-series data set measured when the monitoring target P is determined to be in a normal state in advance, and generates a correlation model representing a correlation between elements in the normal state. For example, the correlation model includes a correlation function representing a correlation between the measurement values of any two elements of a plurality of elements. The correlation function is a function to predict, with respect to an input value of one element of the any two elements, an output value of the other element. At this time, a weight is set for each of the correlation functions between the elements included by the correlation model. The learning unit 12 generates a set of the correlation functions between the elements as mentioned above as the correlation model, and stores into the model storing unit 16.

The analyzing unit 13 acquires a time-series data set measured after the abovementioned correlation model is generated, analyzes the time-series data set, and determines the state of the monitoring target P. As shown in FIG. 2, the analyzing unit 13 includes an anomaly degree calculating unit 21, a section setting unit 22, an encoding learning unit 23, a label setting unit 24, and an anomaly determining unit 25, and performs a process of setting a period requiring no notification of an anomalous state of the monitoring target P and a section label and a process of analyzing and monitoring the state of the monitoring target P as will be described below.

First, a process of setting a period requiring no notification of an anomalous state of the monitoring target P and a section label by the analyzing unit 13 will be described. The anomaly degree calculating unit 21 inputs a time-series data set (time-series data) measured from the monitoring target P, and calculates an anomaly degree indicating a degree to which the monitoring target P is in an anomalous state (information representing an anomalous state) by using a correlation model stored in the model storing unit 16. To be specific, for example, the anomaly degree calculating unit 21 inputs an input value of one element having been measured of two predetermined elements into a correlation function between the two elements to predict an output value of the other element, and checks a difference between the predicted value and an actual measurement value. When the difference is equal to or more than a predetermined value, it is detected as correlation destruction of the correlation between the two elements. Then, the anomaly degree calculating unit 21 checks differences in the correlation functions between the elements and the status of correlation destruction, and calculates an anomaly degree in accordance with the magnitudes of the differences, the weight of the correlation function, the number of correlation destructions, and so on. For example, the anomaly degree calculating unit 21 assumes that a degree to which the monitoring target P is in the anomalous state is higher as the degree of correlation destruction is higher, and calculates the value of an anomaly degree higher. The anomaly degree calculating unit 21 calculates an anomaly degree for each time of the time-series data set. However, the method for calculating the degree of anomaly by the anomaly degree calculating unit 21 is not limited to the method described above, and may be any method.

Figure 3:
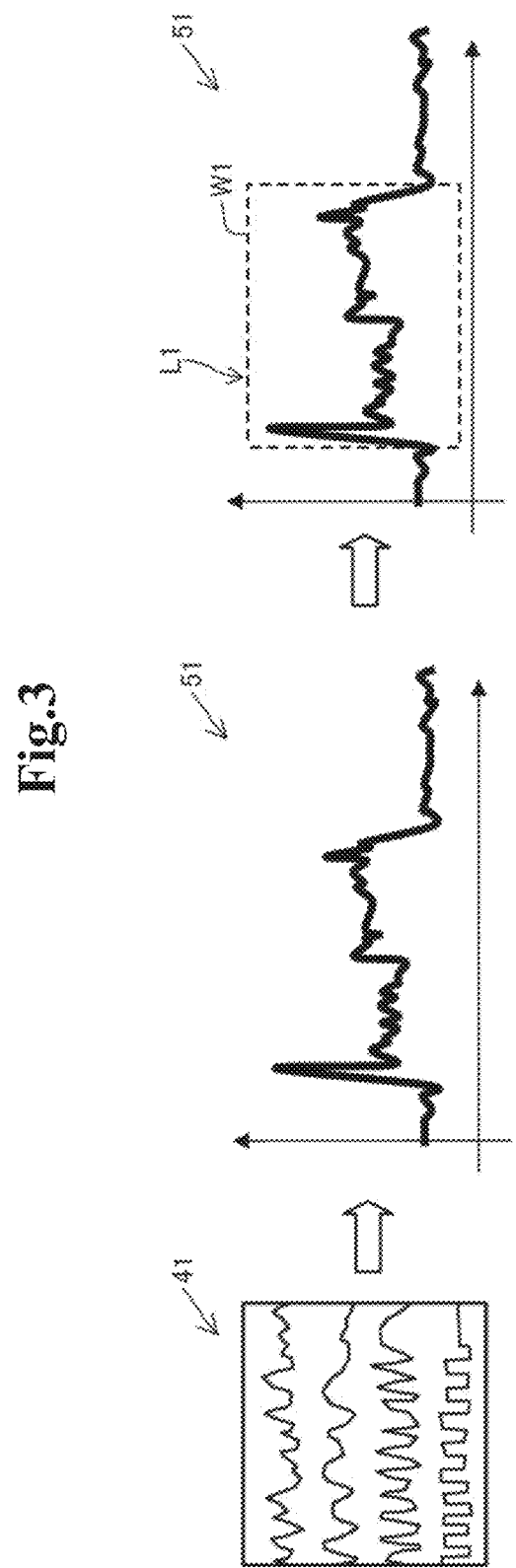
FIG. 3 is a view showing an aspect of time-series data processing by the time-series data processing apparatus disclosed in FIG. 1.

As shown in FIG. 3, the section setting unit 22 outputs the value of the anomaly degree calculated from the time-series data set 41 by the anomaly degree calculating unit 21 (vertical axis) as denoted by reference numeral 51 in a graph of time series (horizontal axis). At this time, the section setting unit 22 outputs so as to display on a display device of an information processing terminal operated by a monitoring person. Then, the section setting unit 22 accepts designation of a section from the monitoring person on the displayed anomaly degree graph 51, and sets the section as a section W1 requiring no notification of an anomalous state (notification-free section). For example, in a case where the monitoring person is aware in advance of a period (time) such as the monitoring target P is in maintenance work or in parts replacement work, the monitoring person designates the period. The section setting unit 22 may automatically set a preset period as the notification-free section W1 without accepting designation of a section from the monitoring person. However, the section setting unit 22 is not limited to setting the notification-free section W1 on the anomaly degree graph 51. For example, the section setting unit 22 may set a section designated by the monitoring person or a preset section as the notification-free section W1 as described above, or may set the notification-free section W1 by any method.

Further, the section setting unit 22 sets a label for the time-series data set of the notification-free section W1 set as described above. In the example shown in FIG. 3, the section setting unit 22 gives a label L1 indicating that the monitoring target P is "maintenance work in progress" to the time-series data of the notification-free section W1. As an example, the section setting unit 22 sets "10:00, Mar. 10, 2019 to 12:00, Mar. 10, 2019" as "section information", and sets "L1: maintenance work in progress" as "label and label content" for the time-series data set. The section setting unit 22 may give a label having a content designated by the monitoring person as described above, or may give a preset label.

The encoding learning unit 23 (generating unit) generates a first encoder (generator) for generating, from the time-series data set in the notification-free section W1 set as described above, state identification information (state information) representing the state of the time-series data set. At this time, the encoding learning unit 23 analyzes the characteristics of the time-series data set and learns, and generates a first encoder having learned so as to generate state identification information corresponding to the content of a label given to the time-series data set. For example, the encoding learning unit 23 analyzes the characteristic of each of a plurality of time-series data sets given different labels, automatically learns a rule enabling classification of the time-series data sets for each of the given labels, and generates a first encoder for generating state identification information corresponding to the content of the time-series data set for each label based on the rule. Consequently, the first encoder generated by the learning is configured to output identical or similar state identification information in a case where the contents of the labels of the time series data sets are identical or similar. The encoding learning unit 23 may generate the first encoder by using a method such as so-called machine learning or deep learning, and may generate the first encoder by using another method such as statistical processing.

Figure 4:
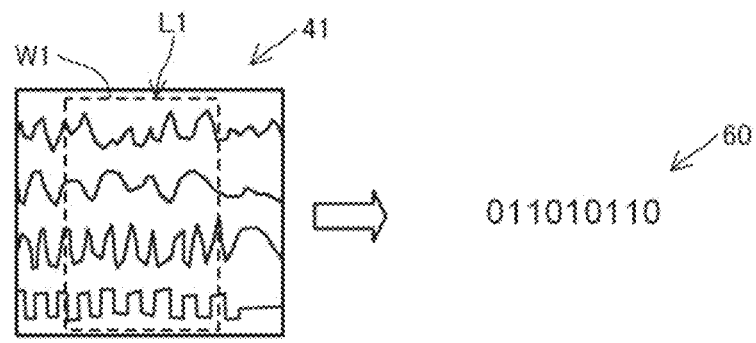
FIG. 4 is a view showing an aspect of time-series data processing by the time-series data processing apparatus disclosed in FIG. 1.

As shown in FIG. 4, the encoding learning unit 23 in this example embodiment generates a first encoder for generating state identification information 60 obtained by encoding the time-series data set in the notification-free section W1 into a binary vector. For example, the first encoder transforms the time-series data set in the notification-free section W1 into a real number vector, and further transforms the real number vector into a binary vector. At this time, the real number vector is a vector in which the value of each dimension takes a real number. The first encoder generated by the encoding learning unit 23 is not limited to encoding the time-series data set into a binary vector, and may encode the time-series data set into a code of any format and may transform the time-series data set into the state identification information 60 of any information.

Figure 5:
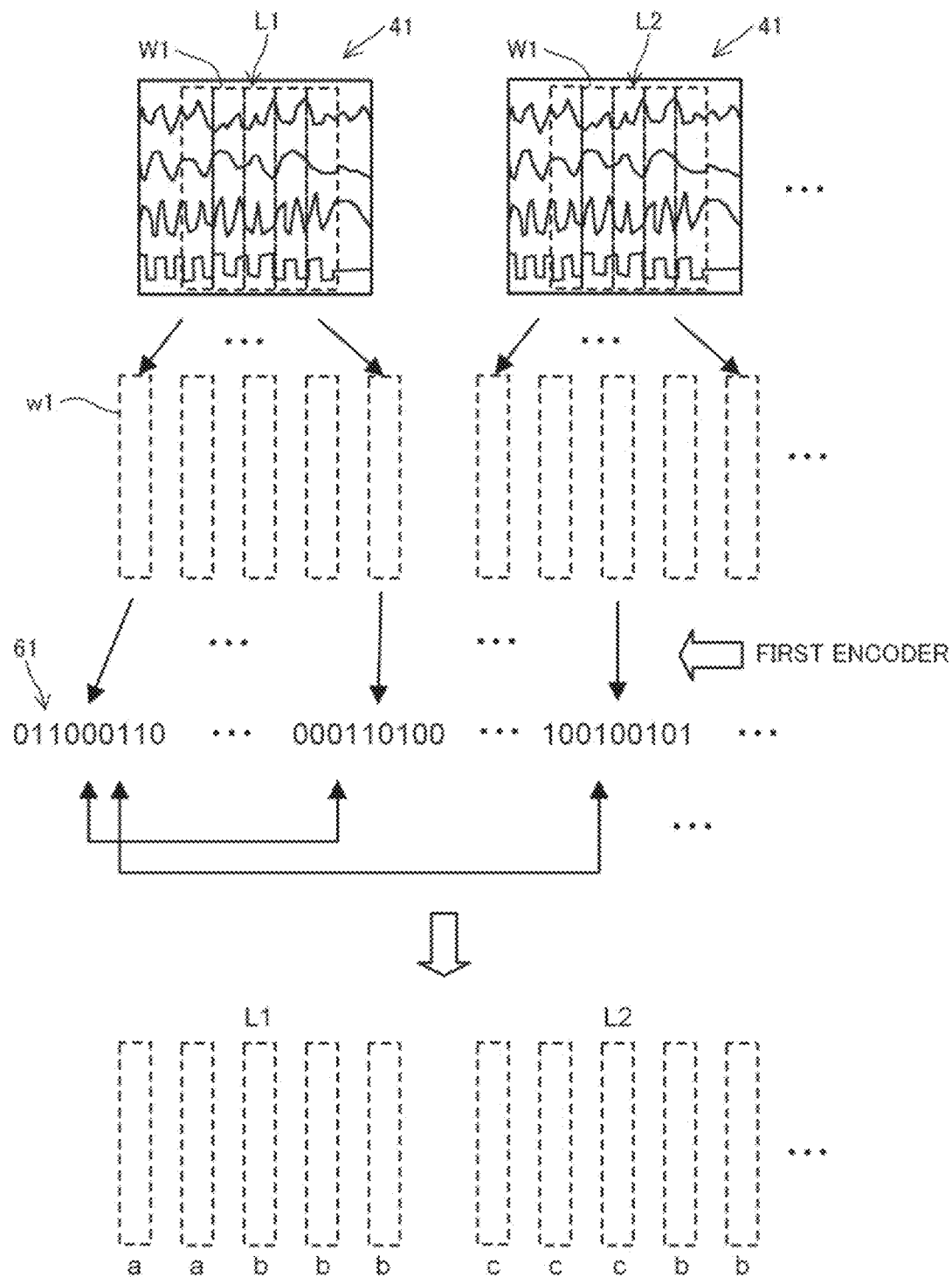
FIG. 5 is a view showing an aspect of time-series data processing by the time-series data processing apparatus disclosed in FIG. 1.

As shown in the views on the first and second rows of FIG. 5, the label setting unit 24 (state information generating unit, classifying unit, second generating unit) divides the time-series data set in the notification-free section W1 given the label as described above into a plurality of division time-series data sets obtained by dividing by a division section W1 having a shorter time width than the time width of the notification-free section W1 (predetermined time width). For example, in a case where the division section w1 has a time width of 1 minute, as described above, the time-series data set in the notification-free section W1 with "10:00, Mar. 10, 2019 to 12:00, Mar. 10, 2019" is divided into 120 division time-series data sets. However, the time width of the division section w1 may be any time width. Then, the label setting unit 24 generates state identification information (state information) representing the state of each of the plurality of division time-series data sets by using the first encoder generated as described above. In this example embodiment, the label setting unit 24 generates the state identification information 61 of a binary vector for each division time-series data set by using the first encoder as shown in the view on the third row of FIG. 5.

Then, the label setting unit 24 compares the state identification information 61 of the division time-series data sets with each other, classifies the division time-series data sets based on the comparison result, and gives new labels according to the classification. To be specific, the label setting unit 24 first calculates a similarity degree of the state identification information 61 between the division time-series data sets as shown in the view on the third row of FIG. 5. At this time, the label setting unit 24 calculates and uses a distance between the state identification information 61 that are multidimensional vectors as the similarity degree, and considers the similarity degree to be higher as the distance is closer. The label setting unit 24 may calculate and use, for example, the Mahalanobis distance or the Hamming distance as the distance between the state identification information 61, and may calculate and use by any other method.

Subsequently, the label setting unit 24 classifies the division time-series data sets based on a preset criterion in accordance with the calculated similarity degree, that is, distance between the division time-series data sets, and gives new labels in accordance with the classification. For example, in a case where the distance between the division time-series data sets is less than a certain value, the label setting unit 24 handles the division time-series data sets as in identical classification, and gives identical labels. In a case where the distance between the division time-series data sets is equal to or more than the certain value, the label setting unit 24 handles the division time-series data sets as in different classifications, and gives different labels. As an example, as shown in the view on the fourth row of FIG. 5, labels a and b are given to the respective division time-series data sets of a time-series data set with a label L1, and labels c and d are given to the respective division time-series data sets of a time-series data set given a label L2. At this time, the label setting unit 24 also sets the contents of the labels newly given to the respective division time-series data sets. For example, the label setting unit 24 sets "a: maintenance work in progress", "b: break from work", "c: parts replacement work in progress", and the like, designated by the monitoring person as "label content". The contents of the labels newly given to the respective division time-series data sets are not limited to the abovementioned ones, and may be information representing any content such as "work by worker A in progress" or "work by worker B in progress". The method for classifying the division time-series data sets is not limited to the abovementioned method, and an existing clustering method may be used, such as DBSCAN (Densitybased spatial clustering of applications with noise), hierarchical clustering, SOM (Self-Organizing Map), and k-NN (k-Nearest Neighbor).

Then, the label setting unit 24 generates a second encoder (new generator) for generating, from the division time-series data sets newly given labels, state identification information (state information) representing the states of the division time-series data sets. At this time, the label setting unit 24 analyzes the characteristics of the division time-series data sets for each label and learns, and generates a second encoder obtained by learning so as to generate state identification information corresponding to the content of the label given to the division time-series data sets. For example, the label setting unit 24 analyzes the characteristics of a plurality of division time-series data sets given different labels, automatically learns a rule enabling classification of the division time-series data sets for each given label and, based on the rule, generates a second encoder for generating state identification information corresponding to the content of the division time-series data set for each label. Consequently, the second encoder generated by the learning is configured to output identical or similar state identification information in a case the contents of the labels of the division time-series data sets are identical or similar. The label setting unit 24 may generate the second encoder by using a method such as so-called machine learning or deep learning, or may generate the second encoder by using another method such as statistical processing.

Figure 6:
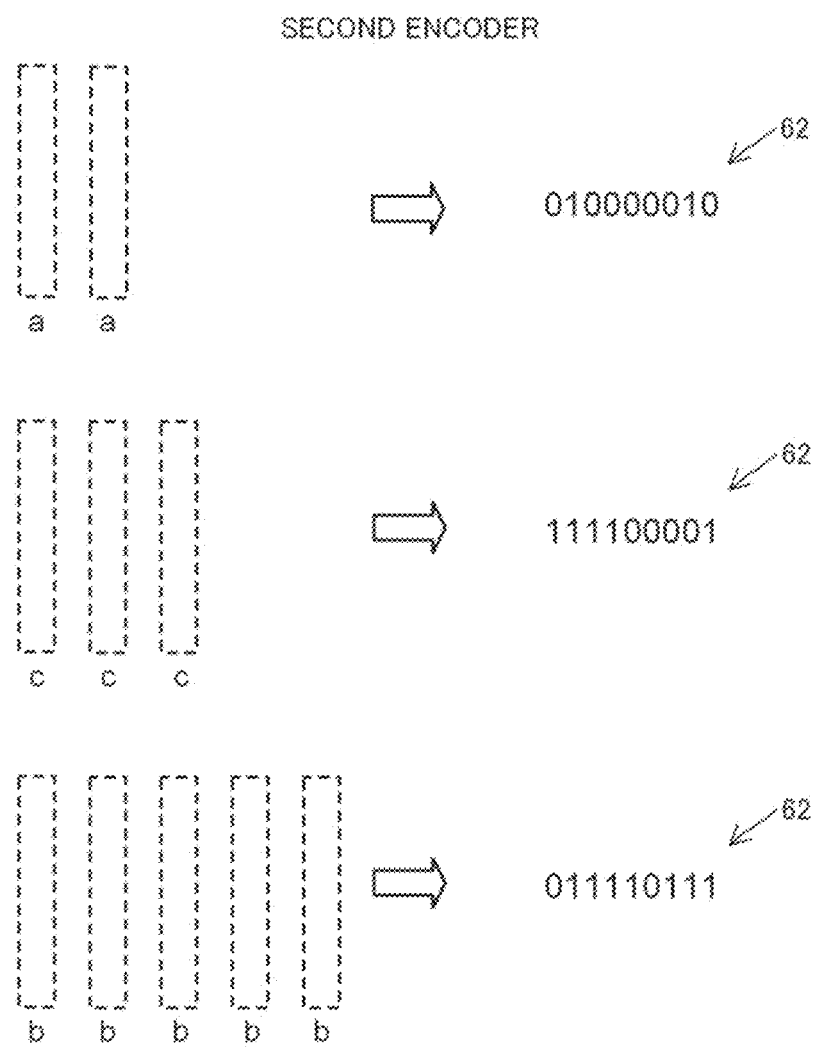
FIG. 6 is a view showing an aspect of time-series data processing by the time-series data processing apparatus disclosed in FIG. 1.
Figure 8:
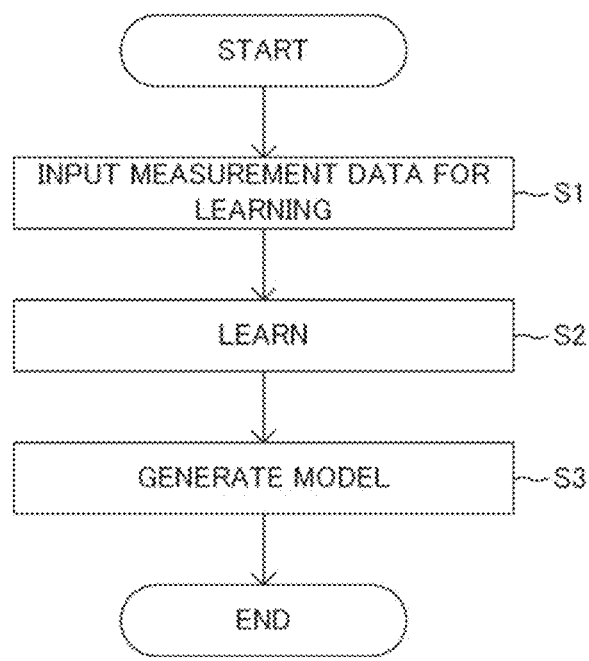
FIG. 8 is a flowchart showing an operation of the time-series data processing apparatus disclosed in FIG. 1.

As shown in FIG. 6, the label setting unit 24 in this example embodiment generates a second encoder for generating state identification information 62 obtained by encoding a division time-series data set given a new label into a binary vector. For example, the second encoder transforms each division time-series data set into a real number vector, and further transforms the real number vector into a binary vector. At this time, a real number vector is a vector in which the value of each dimension takes a real number. The second encoder generated by the label setting unit 24 is not limited to encoding a time-series data set into a binary vector. The second encoder may encode a time-series data set into a code of any format, and may transform a time-series data set into the state identification information 62 of any information.

Then, the label setting unit 24 generates, for each of new labels a, b, and c, the state identification information 62 representing the state of a division time-series data set given the new label a, b, or c by using the second encoder newly generated as described above. Moreover, the label setting unit 24 associates the new label and the label content with the generated state identification information 62, and stores into the state identification information storing unit 17. As an example, the label setting unit 24 associates the new label a and "maintenance work in progress" representing its content with the state identification information 62 generated from the division time-series data set given the new label a, and associates the new label b and "break from work" representing its content with the state identification information 62 generated from the division time-series data set given the new label b.

Next, a process of analyzing and monitoring the state of the monitoring target P by the analyzing unit 13 will be described. The analyzing unit 13 inputs a time-series data set (other time-series data) newly measured from the monitoring target P later, and analyzes and monitors the occurrence of an anomalous state in the monitoring target P. To be specific, first, the anomaly degree calculating unit 21 inputs a time-series data set measured from the monitoring target P and, in the same manner as described above, calculates an anomaly degree indicating a degree to which the monitoring target P is in an anomalous state by using a correlation model stored in the model storing unit 16.

Further, in parallel with the anomaly degree calculation, as shown in FIG. 7, the anomaly determining unit 25 (second state information generating unit) divides a time-series data set 42 measured from the monitoring target P by a division section w2 having the same time width as the abovementioned division time-series data set, and generates state identification information (state information) representing the state of the division time-series data set by using a second encoder (new generator). At this time, the anomaly determining unit 25 generates state identification information obtained by encoding the division time-series data set into a binary vector in the same manner as described above. The anomaly determining unit 25 may generate state identification information with respect to all the division time-series data sets of predetermined section newly measured, or may generate, only from the division time-series data set when it is determined that an anomalous state has occurred based on the anomaly degree, state identification information representing the state of the division time-series data set as will be described later.

Then, the anomaly determining unit 25 determines whether or not an anomalous state has occurred in the monitoring target P based on the anomaly degree calculated from the monitoring target P. For example, when the anomaly degree continues to be equal to or more than a preset threshold value for a certain period of time, the anomaly determining unit 25 determines that an anomalous state has occurred. However, the anomaly determining unit 25 may determine that an anomalous state has occurred based on any criterion. Then, the anomaly determining unit 25 notifies the result of determination whether or not an anomalous state has occurred to the output unit 14 together with the anomaly degree as the result of analysis of the anomalous state of the time-series data set.

Furthermore, the anomaly determining unit 25 determines whether or not identical information to the state identification information generated from the time-series data set is stored in the state identification information storing unit 17, that is, whether or not the newly generated state identification information is registered in the state information storing unit 17. Then, the anomaly determining unit 25 notifies, as the result of analysis of the anomalous state of the time-series data set, the anomaly degree and the result of determination of the anomalous state described above and, in a case where the state identification information is registered in the state identification information storing unit 17, a fact that the state identification information is registered and the label and the label content that are associated with the state identification information to the output unit 14. In a case where the state identification information is generated only from the division time-series data set when it is determined that an anomalous state has occurred based on the anomaly degree as described above, the anomaly determining unit 25 determines whether or not the state identification information is registered in the state identification information storing unit 17 and, in a case where the state identification is registered, the label and the label content. That is to say, in this case, the state identification information is not generated when it is not determined that an anomalous state has occurred, so that the anomaly determining unit 25 does not determine whether or not the state identification information is registered in the state identification information storing unit 17, and notifies only the anomaly degree and the result of determination whether or not an anomalous state has occurred to the output unit 14.

In a case where information which is similar or corresponding to state identification information generated from a division time-series data set based on a preset criterion is stored in the state identification storing unit 17, the anomaly determining unit 25 may determine that the generated state identification information is registered. That is to say, not only when the generated state identification information and the information stored in the state identification information storing unit 17 completely match, but also when the information correspond to each other according to a preset criterion, the anomaly determining unit 25 may determine that the generated state identification information is registered in the state identification information storing unit 17.

The output unit 14 controls the output of output information relating to an anomalous state based on the result of analysis of a time-series data set. At this time, the output unit 14 determines whether or not it is an anomalous state and notification to the monitoring person is required based on the result of determination whether or not the anomalous state has occurred and the result of determination whether or not state identification information is registered, and controls the presence or absence of the output of notification information to the monitoring person. For example, when it is determined that an anomalous state has occurred and state identification information generated from the time-series data set is not registered in the state identification information storing unit 17, the output unit 17 outputs notification information to the monitoring person. At this time, for example, the output unit 14 transmits notification information representing the occurrence of the anomaly to a registered monitoring person's mail address, or outputs so as to display the notification information on a display screen of a monitoring terminal connected to the time-series data processing apparatus 10 and operated by the monitoring person.

On the other hand, even when it is determined that an anomalous state has occurred based on an anomaly degree, if state identification information generated from the time-series data set is not registered in the state identification information storing unit 17, the output unit 14 stops output of the notification information to the monitoring person. That is to say, even if an anomalous state has occurred, the output unit 14 does not notify the occurrence of the anomalous state to the monitoring person.

Further, the output unit 14 also outputs the anomaly degree of the monitoring target P to the monitoring person. At this time, the output unit 14 displays the anomaly degree when the state identification information is registered separately from other anomaly degrees. For example, in a case where the time-series data set denoted by reference numeral 42 of FIG. 7 is measured, the state identification information of the division time-series data set of the division section denoted by reference numeral w2 is uniformly calculated with the passage of time, and state identification information of a partial section R1 is registered, the output unit 14 displays an anomaly degree corresponding to the section R1 separately from other anomaly degrees. As an example, as shown in the right-upper view of FIG. 7, in a graph showing the anomaly degree, the output unit 14 fills the section R1 with state identification information registered by a predetermined color and displayed so as to distinguish from other sections. In addition to this, the output unit 14 displays and outputs a label and a label content that are associated with the registered state identification information in association the anomaly degree of the section R1. As an example, as shown in the right-upper view of FIG. 7, the output unit 14 displays and outputs character information of "maintenance work in progress" indicating the content of the label a on a section where the state identification information of the division time-series data set corresponds to the new label a, displays and outputs character information of "break from work" indicating the content of the label b on a section where the state identification information of the division time-series data set corresponds to the new label b.

The output unit 14 is not limited to displaying an anomaly degree by the method as shown in the right-upper view of FIG. 7, and may display by any method. For example, as shown in the right-middle view of FIG. 7, the output unit 14 may display the graph of the anomaly degree of the section R1 whose state identification information is registered by a dotted line and display other sections by a solid line, and also display character information representing the content of the label of each section.

In addition to displaying the anomaly degree when the state identification information is registered separately from other anomaly degrees in the anomaly degree graph, the output unit 14 may display the anomaly degree when it is determined to an anomalous state separately from other anomaly degrees. As an example, in the example shown in the right-lower view of FIG. 7, in a graph showing the anomaly degree, the output unit 14 may display a section R2 that state identification information is not registered and it is determined to be an anomalous state by enclosing in a frame so as to distinguish from other sections.

Furthermore, the output unit 14 may display character information representing the state of the anomaly degree in the anomaly degree graph. For example, as shown in the right-lower view of FIG. 7, the output unit 14 may display characters of "notification-free section" indicating that no notification is required on the section R1 that the state identification information is registered, or characters of "anomaly" on a section where it is determined to be the anomalous state.

[Operation]

Next, an operation of the above time-series data processing apparatus 10 will be described mainly with reference to flowcharts shown in FIGS. 8 to 11. First, with reference to the flowchart of FIG. 8, an operation when generating a correlation model representing a correlation between elements in a case where the monitoring target P is in a normal state will be described.

The time-series data processing apparatus 10 retrieves data for learning that is a time-series data set measured when the monitoring target P is determined to be in a normal state from the measurement data storing unit 15 and inputs the data (step S1). Then, the time-series data processing apparatus 10 learns a correlation between elements from the input time-series data (step S2), and generates a correlation model representing the correlation between the elements (step S3).

Figure 9:
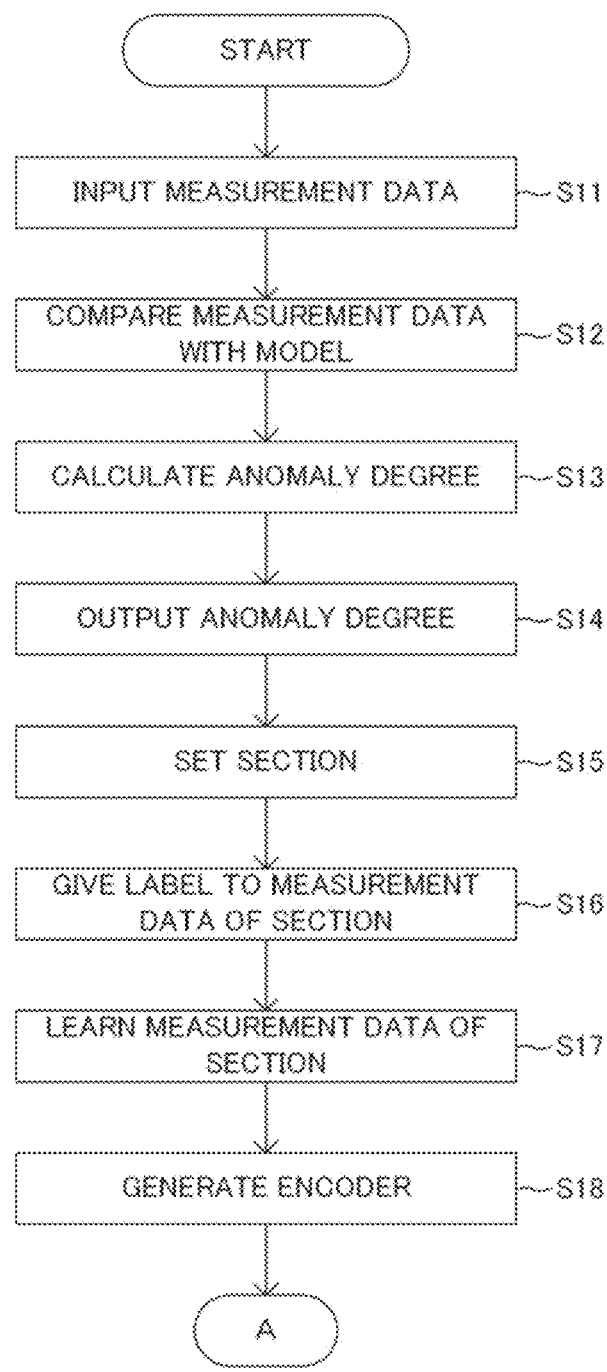
FIG. 9 is a flowchart showing an operation of the time-series data processing apparatus disclosed in FIG. 1.
Figure 10:
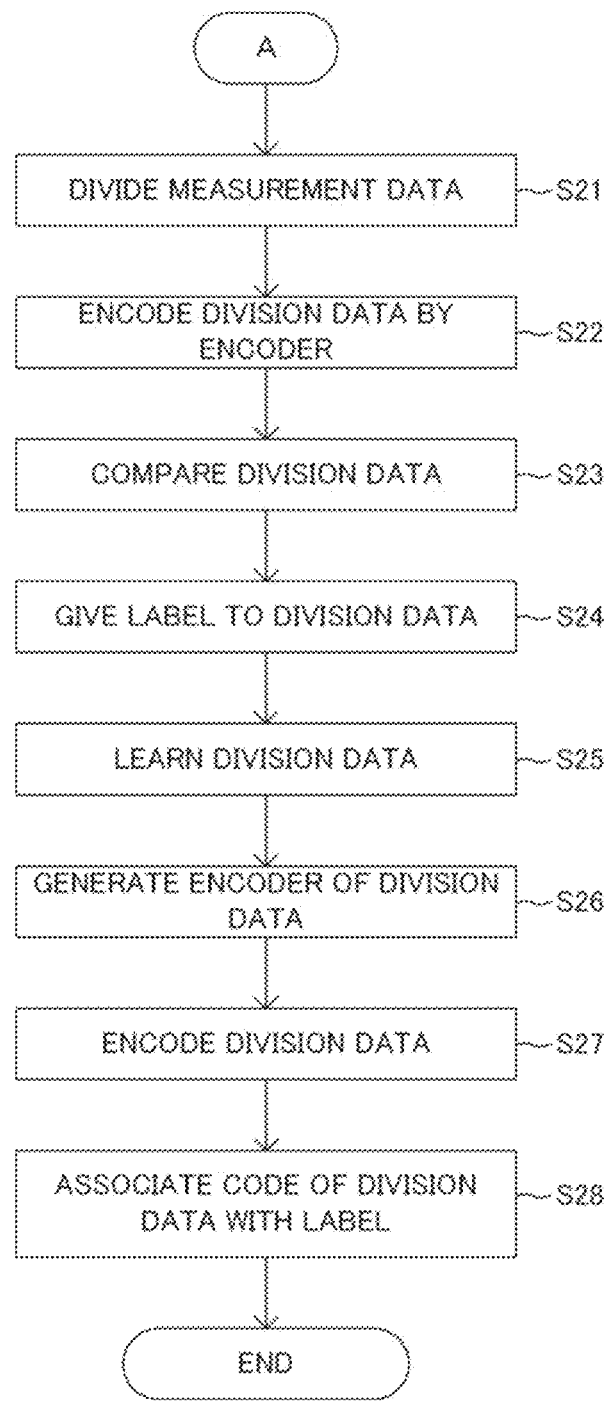
FIG. 10 is a flowchart showing an operation of the time-series data processing apparatus disclosed in FIG. 1.

Next, with reference to the flowcharts of FIGS. 9 and 10, a process of setting a period requiring no notification of an anomalous state of the monitoring target P and a period label will be described. First, the time-series data processing apparatus 10 inputs a time-series data set newly measured from the monitoring target P (step S11). Then, the time-series data processing apparatus 10 compares the input time-series data set with the correlation model stored in the model storing unit 16 (step S12), and calculates an anomaly degree indicating a degree to which the monitoring target P is in an anomalous state (step S13). At this time, for example, the time-series data processing apparatus 10 inputs an input value of one element of predetermined two elements having been measured into a correlation function between the two elements to predict an output value of the other element, checks a difference between the predicted value and the actual measurement value, and calculates an anomaly degree in accordance with the magnitude of the difference, the weight of the correlation function, the number of correlation destructions, and so on.

Subsequently, the time-series data processing apparatus 10 outputs the graph 51 of an anomaly degree calculated from the time-series data set 41 as shown in FIG. 3 (step 14). At this time, the section setting unit 22 outputs so as to display on the display device of the information processing terminal operated by the monitoring person. Then, when accepting designation of a section from the monitoring person on the displayed anomaly degree graph 51, the time-series data processing apparatus 10 sets the designated section as a section W1 requiring no notification of the anomalous state (notification-free section W1) as denoted by reference numeral W1 of FIG. 3 (step S15). The time-series data processing apparatus 10 may automatically set a preset period as the notification-free section W1 without accepting the designation of the section from the monitoring person. Moreover, when accepting the designation of a label of the set section from the monitoring person, the time-series data processing apparatus 10 sets a label L1 indicating that the monitoring target P is in "maintenance work in progress" on the time-series data of the section W1 as shown in FIG. 3 (step S16).

Subsequently, the time-series data processing apparatus 10 learns a time-series data set within the set notification-free section W1 (step S17), and generates a first encoder for generating state identification information representing the state of the time-series data set (step S18). For example, the time-series data processing apparatus 10 analyzes the characteristics of a plurality of time-series data sets given different labels, automatically learns a rule enabling classification of the time-series data sets for each given label, and generates a first encoder for generating state identification information corresponding to the content of the time-series data set of each label based on the rule.

Subsequently, as shown in the views on the first and second rows of FIG. 5, the time-series data processing apparatus 10 divides the time-series data set within the notification-free section W1 given the label as described above into a plurality of division time-series data sets obtained by dividing by the division section w1 having a shorter time width than the notification-free section W1 (step S21). Then, the time-series data processing apparatus 10 generates state identification information representing the state of each of the division time-series data sets as shown in the view on the third row of FIG. 5 by using the first encoder generated as described above (step S22).

Subsequently, the-time series data processing apparatus 10 compares the state identification information 61 of the division time-series data sets with each other as shown in the views on the third row of FIG. 5 (step S23), classifies the division time-series data sets in accordance with the comparison result, and gives a new label to each of the division time-series data sets in accordance with the classification (step S24). To be specific, the time-series data processing apparatus 10 calculates a distance between the state identification information 61 of the division time-series data sets as a similarity degree. When the distance is less than a certain value, the time-series data processing apparatus 10 handles the division time-series data sets as in identical classification and gives identical labels thereto. When the distance is equal to or more than the certain value, the time-series data processing apparatus 10 regards the division time-series data sets as in different classifications and gives different labels thereto. As an example, as shown in the view on the fourth row of FIG. 5, the time-series data processing apparatus 10 gives a label a "maintenance work in progress" and a label b "break from work" to the respective division time-series data sets of the time-series data set having a label L1, and gives a label c "parts replacement work in progress" and the label b "break from work" to the respective division time-series data sets of the time-series data set having a label L2.

Subsequently, the time-series data processing apparatus 10 learns each of the division time-series data sets given the new labels (step S25), and generates a second encoder for generating state identification information representing the state of the division time-series data set (step S26). At this time, the time-series data processing apparatus analyzes the characteristics of a plurality of division time-series data sets given different labels, automatically learns a rule enabling classification of the division time-series data sets for each of the given labels, and generates a second encoder for generating state identification information corresponding to the content of the division time-series data set for each label based on the rule.

Subsequently, as shown in FIG. 6, the time-series data processing apparatus 10 uses the newly generated second encoder to generate, for each of new labels a, b, and c, the state identification information 62 representing the state of the division time-series data set given the new label a, b, or c (step S27). Moreover, the time-series data processing apparatus 10 associates the new label and label content with the generated state identification information 62, and stores into the state identification information storing unit 17 (step S28). As an example, the time-series data processing apparatus 10 associates the new label a and "maintenance work in progress" representing its content with the state identification information 62 generated from the division time-series data set given the new label a, and associates the new label b and "break from work" representing its content with the state identification information 62 generated from the division time-series data set given the new label b.

Figure 11:
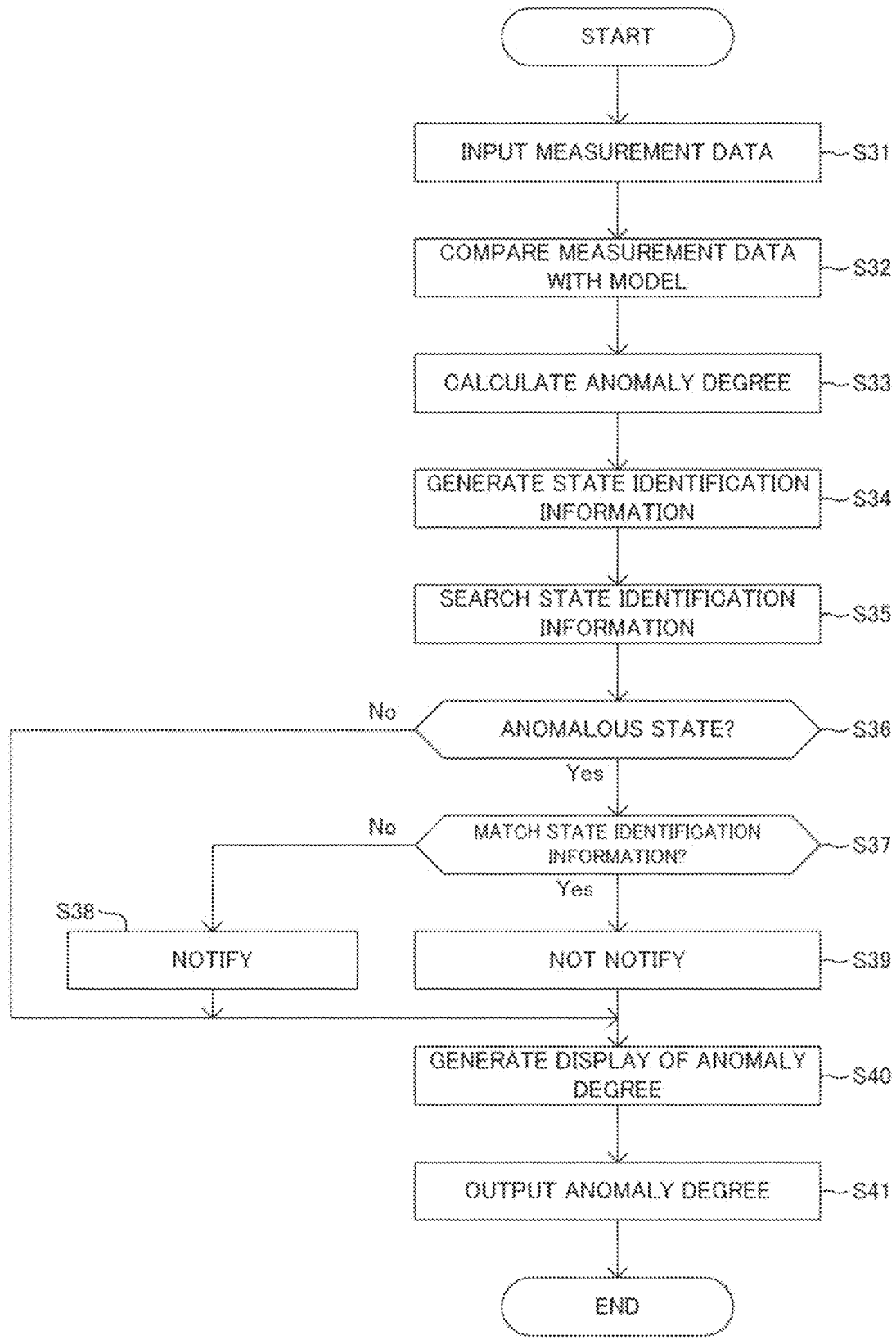
FIG. 11 is a flowchart showing an operation of the time-series data processing apparatus disclosed in FIG. 1.

Next, with reference to the flowchart of FIG. 11, a process of analyzing and monitoring the state of the monitoring target P will be described. First, the time-series data processing apparatus 10 inputs a time-series data set newly measured from the monitoring target P (other time-series data) (step S31). Then, the time-series data processing apparatus 10 compares the input time-series data set with the correlation model stored in the model storing unit 16 (step S32), and calculates an anomaly degree indicating a degree to which the monitoring target P is in an anomalous state (step S33). At this time, for example, the time-series data processing apparatus 10 inputs an input value of one element of predetermined two elements having been measured into a correlation function between the two elements included in the correlation model to predict an output value of the other element, checks a difference between the predicted value and the actual measurement value, and calculates an anomaly degree in accordance with the magnitude of the difference, the weight of the correlation function, the number of correlation destructions, and so on.

Further, as shown in FIG. 7, the time-series data processing apparatus 10 divides the time-series data set 42 measured from the monitoring target P by the division section w2 having the same time width as the abovementioned division time-series data set, and generates state identification information representing the state of the division time-series data set by using the second encoder (step S34). Then, the time-series data processing apparatus 10 determines whether or not information that is identical or similar to the generated state identification information is stored in the state identification information storing unit 17, that is, whether or not information that is identical or similar to the generated state identification information is registered in the state identification information storing unit 17 (step S35).

Subsequently, the time-series data processing apparatus 10 determines whether or not an anomalous state has occurred in the monitoring target P based on the calculated anomaly degree (step S36). For example, when the anomaly degree has continued to be equal to or more than a preset threshold value for a certain period of time, the anomaly determining unit 24 determines that an anomalous state has occurred. Then, in the case of determining that an anomalous state has occurred in the monitoring target P (step S36, Yes), the time-series data processing apparatus 10 considers the result of determination whether or not the state identification information generated in the abovementioned manner is registered in the state identification information storing unit 17 (step S37), and controls the presence/absence of notification of the occurrence of the anomaly state to the monitoring person. For example, in a case where an anomalous state has occurred in the monitoring target P (step S36, Yes) and state identification information generated from a time-series data set at that time is not registered in the state identification information storing unit 17 (step S37, No), the time-series data processing apparatus 10 outputs notification information to the monitoring person (step S38). On the other hand, even when an anomalous state has occurred in the monitoring target P (step S36, Yes), in a case where state identification information generated from a time-series data set at that time is registered in the state identification information storing unit 17 (step S37, Yes), the time-series data processing apparatus 10 does not output notification information to the monitoring person (step S39).

Further, the time-series data processing apparatus 10 generates display information for outputting the anomaly degree based on the abovementioned result of determination whether or not an anomalous state has occurred and the result of determination whether or not the state identification information is registered (step S40), and displays and outputs to the monitoring person (step S41). For example, as shown in FIG. 7, in a case where state identification information generated from a division time-series data set is registered, the time-series data processing apparatus 10 displays that an anomaly degree section corresponding to the division time-series data set is a notification-free section R1, and in a case where a new label is associated with the state identification information of the time-series data set of the notification-free section R1 and registered, the time-series data processing apparatus 10 outputs so as to display information representing the content of the label on the section. For example, as shown in the right-upper view of FIG. 7, on a section in which the state identification information of the time-series data set corresponds to a new label a, character information of "maintenance work in progress" representing the content of the label a is displayed and output. On a section in which the state identification information of the time-series data set corresponds to a new label b, character information of "break from work" representing the content of the label b is displayed and output.

In the above, an anomaly degree itself is displayed and output and, when an anomalous state occurs, the occurrence of the anomaly state is notified to the monitoring person. However, either the display and output of an anomaly degree or the notification to the monitoring person may be performed.

Thus, according to the present invention, first, a first encoder that outputs state identification information corresponding to a label given to a time-series data is generated from the time-series data, state identification information of division time-series data obtained by dividing the time-series data are generated using the first encoder, and the division time-series data are classified based on the state identification information and given new labels. Then, from the division time-series data given the new labels, a second encoder that outputs state identification information corresponding to the new labels is further generated. Therefore, by generating and monitoring the state identification information of the time-series data of a monitoring target by using the second encoder, it is possible to predict the state of the monitoring target with high accuracy.

Although a new label is given to each division time-series data obtained by dividing time-series data in a section where an anomalous state has occurred but no notification is required in the above description, a new label may be given to time-series data in another section. For example, a new label may be given to division time-series data obtained by dividing time-series data in a section where an anomalous state has occurred and notification is required. With this, it is possible to predict the content of the anomalous state in more detail.

Second Example Embodiment

Figure 12:
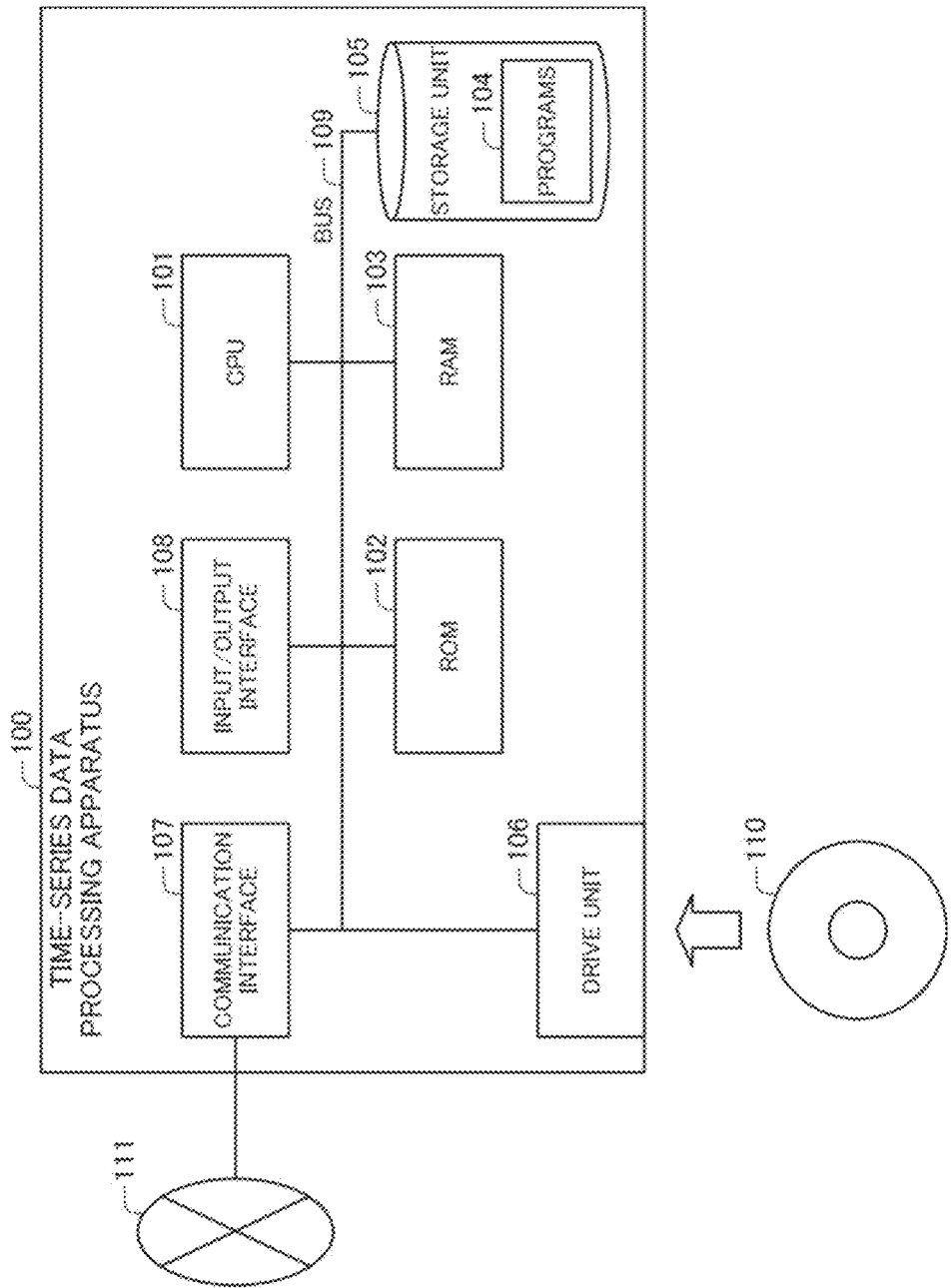
FIG. 12 is a block diagram showing a hardware configuration of a time-series data processing apparatus according to a second example embodiment of the present invention.
Figure 13:
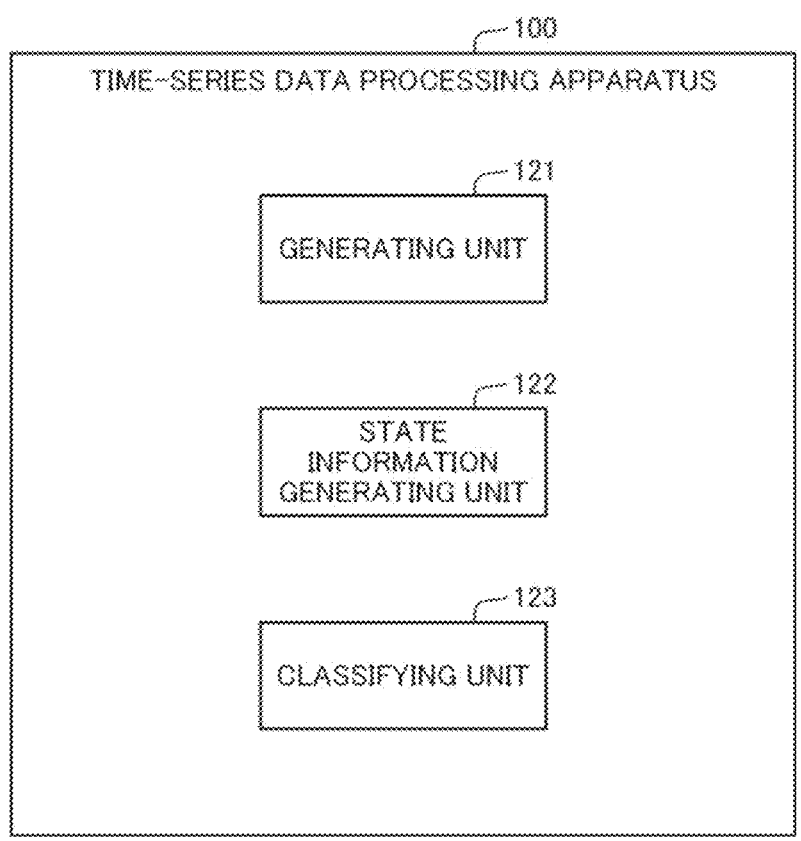
FIG. 13 is a block diagram showing a configuration of the time-series data processing apparatus according to the second example embodiment of the present invention.
Figure 14:
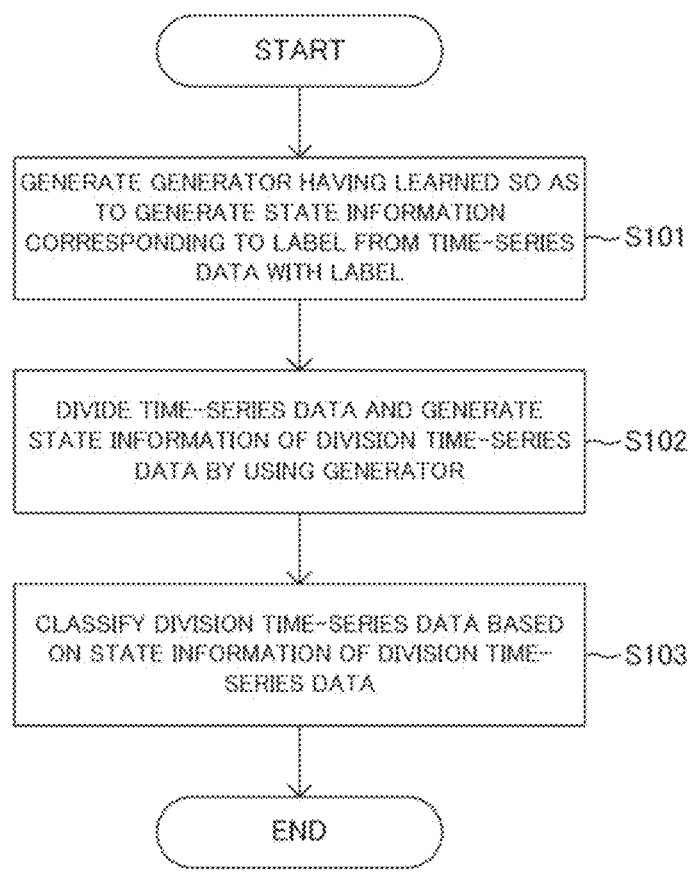
FIG. 14 is a flowchart showing a configuration of the time-series data processing apparatus according to the second example embodiment of the present invention.

Next, a second example embodiment of the present invention will be described with reference to FIGS. 12 to 14. FIGS. 12 to 13 are block diagrams showing a configuration of a time-series data processing apparatus in the second example embodiment, and FIG. 14 is a flowchart showing an operation of the time-series data processing apparatus. This example embodiment shows the overview of the configurations of the time-series data processing apparatus and the time-series data processing method described in the first example embodiment.

First, with reference to FIG. 12, a hardware configuration of a time-series data processing apparatus 100 in this example embodiment will be described. The time-series data processing apparatus 100 is composed of a general information processing apparatus. As an example, the time-series data processing apparatus 100 has the following hardware configuration including;

- a CPU (Central Processing Unit) 101 (arithmetic unit),
- a ROM (Read Only Memory) 102 (storage unit),
- a RAM (Random Access Memory) 103 (storage unit),
- programs 104 loaded to the RAM 103,
- a storage unit 105 for storing the programs 104,
- a drive unit 106 reading and writing from and into a storage medium 110 outside the information processing apparatus,
- a communication interface 107 connected to a communication network 111 outside the information processing apparatus, and
- a bus connecting the components.

Then, by acquisition and execution of the programs 104 by the CPU 101, the time-series data processing apparatus 100 can structure and have a generating unit 121, a state information generating unit 122, and a classifying unit 123 shown in FIG. 13. The programs 104 are, for example, stored in the storage unit 105 or the ROM 102 in advance and loaded into the RAM 103 and executed by the CPU 101 as necessary. The programs 104 may be supplied to the CPU 101 via the communication network 111, or may be stored in the storage medium 110 in advance to be retrieved by the drive unit 106 and supplied to the CPU 101. The generating unit 121, the state information generating unit 122, and the classifying unit 123 mentioned above may be structured by electric circuits.

FIG. 12 shows an example of the hardware configuration of the information processing apparatus serving as the time-series data processing apparatus 100, and the hardware configuration of the information processing apparatus is not illustrated in the above case. For example, the information processing apparatus may include part of the abovementioned configuration, for example, excluding the drive unit 106.

The time-series data processing apparatus 100 executes a time-series data processing method shown in the flowchart of FIG. 14 by the functions of the generating unit 121, the state information generating unit 122, and the classifying unit 123 structured by the programs as described above.

As shown in FIG. 14, the time-series data processing apparatus 100 executes processes of: generating a generator that has learned so as to generate state information representing a state of time-series data having a predetermined time width in accordance with a label given to the time-series data (step S101); generating, by using the generator, state information representing a state of division time-series data obtained by dividing the time-series data by a shorter time width than the predetermined time width (step S102); and classifying a plurality of division time-series data based on the state information of the plurality of division time-series data (step S103).

With the configuration as described above, the present invention generates a generator outputting state information corresponding to a label given to time-series data from the time-series data, generates state identification information of division time-series data obtained by dividing the time-series data by using the generator, and classifies the division time-series data based on the state identification information. Therefore, it is possible to predict the state of a monitoring target in detail at time widths obtained by dividing the time-series data, and it is possible to increase the accuracy of state prediction.

<Supplementary Notes>

The whole or part of the example embodiments disclosed above can be described as the following supplementary notes. Below, the overview of the configurations of a time-series data processing method, a time-series data processing apparatus, and a program according to the present invention will be described. However, the present invention is not limited to the following configurations.

(Supplementary Note 1)

A time-series data processing method comprising:
generating a generator having learned so as to generate state information representing a state of time-series data having a predetermined time width in accordance with a label given to the time-series data;
generating, by using the generator, state information representing a state of division time-series data obtained by dividing the time-series data by a shorter time width than the predetermined time width; and
classifying a plurality of division time-series data based on state information of the plurality of division time-series data.

(Supplementary Note 2)

The time-series data processing method according to Supplementary Note 1, comprising
giving a new label to the division time-series data in accordance with classification of the division time-series data.

(Supplementary Note 3)

The time-series data processing method according to Supplementary Note 2, comprising
generating a new generator having learned so as to generate state information representing a state of the division time-series data given the new label in accordance with the new label.

(Supplementary Note 4)

The time-series data processing method according to Supplementary Note 3, comprising
generating, by using the new generator, state information representing a state of other division time-series data obtained by dividing other time-series data by a same time width as that of the division time-series data, and controlling output of output information based on the state information of the other division time-series data.

(Supplementary Note 5)

The time-series data processing method according to Supplementary Note 4, comprising
outputting the output information including the new label based on the state information of the other division time-series data.

(Supplementary Note 6)

The time-series data processing method according to Supplementary Note 5, comprising:
generating the state information of the division time-series data by using the new generator, and storing the state information of the division time-series data and the new label given to the division time-series data in association with each other; and
based on the state information of the other time-series data and the stored state information of the division time-series data, outputting the output information including the new label associated with the division time-series data.

(Supplementary Note 7)

The time-series data processing method according to any of Supplementary Notes 4 to 6, comprising
setting a predetermined section of the time-series data based on a result of analysis of the time-series data and, in accordance with the label given to the time-series data included in the set section, generating the generator having learned so as to generate state information representing a state of the time time-series data.

(Supplementary Note 8)

The time-series data processing method according to Supplementary Note 7, comprising
analyzing an anomalous state of the time-series data, setting the section based on information representing the anomalous state, giving the label to the time-series data included in the section, and generating the generator having learned so as to generate state information representing a state of the time-series data in accordance with the label.

(Supplementary Note 9)

The time-series data processing method according to any of Supplementary Notes 3 to 8, comprising
generating, for each of the new labels, the new generator having learned so as to generate state information corresponding to a content of the division time-series data given the new label.

(Supplementary Note 10)

The time-series data processing method according to any of Supplementary Notes 1 to 9, comprising generating, for each of the labels, the generator having learned so as to generate state information corresponding to a content of the time-series data given the label.

(Supplementary Note 11)

The time-series data processing method according to any of Supplementary Notes 1 to 10, comprising
classifying the plurality of division time-series data based on a degree of similarity of the plurality of division time-series data.

(Supplementary Note 12)

A time-series data processing apparatus comprising:
a generating unit configured to generate a generator having learned so as to generate state information representing a state of time-series data having a predetermined time width in accordance with a label given to the time-series data;
a state information generating unit configured to generate, by using the generator, state information representing a state of division time-series data obtained by dividing the time-series data by a shorter time width than the predetermined time width; and
a classifying unit configured to classify a plurality of division time-series data based on state information of the plurality of division time-series data.

(Supplementary Note 13)

The time-series data processing apparatus according to Supplementary Note 12, wherein
the classifying unit is configured to give a new label to the division time-series data in accordance with classification of the division time-series data.

(Supplementary Note 14)

The time-series data processing apparatus according to Supplementary Note 13, comprising
a second generating unit configured to generate a new generator having learned so as to generate state information representing a state of the division time-series data given the new label in accordance with the new label.

(Supplementary Note 15)

The time-series data processing apparatus according to Supplementary Note 14, comprising:
a second state information generating unit configured to generate, by using the new generator, state information representing a state of other division time-series data obtained by dividing other time-series data by a same time width as that of the division time-series data; and
an output unit configured to control output of output information based on the state information of the other division time-series data.

(Supplementary Note 16)

The time-series data processing method according to Supplementary Note 15, wherein
the output unit is configured to output the output information including the new label based on the state information of the other division time-series data.

(Supplementary Note 17)

The time-series data processing apparatus according to Supplementary Note 16, wherein:
the second generating unit is configured to generate the state information of the division time-series data by using the new generator, and store the state information of the division time-series data and the new label given to the division time-series data in association with each other; and
the output unit is configured to, based on the state information of the other time-series data and the stored state information of the division time-series data, output the output information including the new label associated with the division time-series data.

(Supplementary Note 18)

The time-series data processing apparatus according to any of Supplementary Notes 15 to 17, comprising
a section setting unit configured to set a predetermined section of the time-series data based on a result of analysis of the time-series data and give the label to the time-series data included in the set section,
wherein the generating unit is configured to, in accordance with the label given to the time-series data, generate the generator having learned so as to generate state information representing a state of the time time-series data.

(Supplementary Note 19)

The time-series data processing apparatus according to Supplementary Note 18, wherein:
the section setting unit is configured to analyze an anomalous state of the time-series data, set the section based on information representing the anomalous state, and give the label to the time-series data included in the section; and
the generating unit is configured to generate the generator having learned so as to generate state information representing a state of the time-series data given the label in accordance with the label.

(Supplementary Note 20)

A computer program comprising instructions for causing an information processing apparatus to realize:
a generating unit configured to generate a generator having learned so as to generate state information representing a state of time-series data having a predetermined time width in accordance with a label given to the time-series data;
a state information generating unit configured to generate, by using the generator, state information representing a state of division time-series data obtained by dividing the time-series data by a shorter time width than the predetermined time width; and
a classifying unit configured to classify a plurality of division time-series data based on state information of the plurality of division time-series data.

(Supplementary Note 21)

The computer program according to Supplementary Note 20,
wherein the classifying unit is configured to give a new label to the division time-series data in accordance with classification of the division time-series data,
the computer program comprising the instructions for causing the information processing apparatus to further realize a second generating unit configured to generate a new generator having learned so as to generate state information representing a state of the division time-series data given the new label in accordance with the new label.

(Supplementary Note 22)

The computer program according to Supplementary Note 21, comprising instructions for causing the information processing apparatus to further realize:
a second state information generating unit configured to generate, by using the new generator, state information representing a state of other division time-series data obtained by dividing other time-series data by a same time width as that of the division time-series data; and
an output unit configured to control output of output information based on the state information of the other division time-series data.

The abovementioned program can be stored using various types of non-transitory computer-readable mediums and supplied to a computer. The non-transitory computer-readable mediums include various types of tangible recording mediums. Examples of the non-transitory computer-readable mediums include a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory)). Moreover, the program may be supplied to a computer by various types of transitory computer-readable mediums. Examples of the transitory computer-readable mediums include an electric signal, an optical signal, and an electromagnetic wave. The transitory computer-readable medium can supply the program to a computer via a wired communication channel such as an electric wire and an optical fiber or via a wireless communication channel.

Although the present invention has been described above with reference to the example embodiments and so on, the present invention is not limited to the above example embodiments. The configurations and details of the present invention can be changed in various manners that can be understood by one skilled in the art within the scope of the present invention.

DESCRIPTION OF NUMERALS

- 10 time-series data processing apparatus
- 11 measuring unit
- 12 learning unit
- 13 analyzing unit
- 14 output unit
- 15 measurement data storing unit
- 16 model storing unit
- 17 state identification information storing unit
- 21 anomaly degree calculating unit
- 22 section setting unit
- 23 encoding learning unit
- 24 label setting unit
- 25 anomaly determining unit
- 100 time-series data processing apparatus
- 101 CPU
- 102 ROM
- 103 RAM
- 104 programs
- 105 storage unit
- 106 drive unit
- 107 communication interface
- 108 input/output interface
- 109 bus
- 110 storage medium
- 111 communication network
- 121 generating unit
- 122 state information generating unit
- 123 classifying unit

What is claimed is:

1. A time-series data processing method comprising:
   receiving, by a processor, time-series data regarding a manufacturing facility measured by sensors;
   identifying, by the processor, a predetermined time width in which the time-series data matches a specified label;
   dividing, by the processor, the time-series data in the predetermined time width in which the time-series data matches the specified label by a shorter time width than the predetermined time width to generate a plurality of division time-series data;
   classifying, by the processor and using a generator, a state of each of the plurality of division time-series data as anomalous or non-anomalous, by:
      calculating a similarity degree between each of the division time-series data and each a plurality of pre-classified division time series data;
      assigning the state of each of the division time-series data as anomalous or non-anomalous in accordance with the pre-classified division time series with which the each of the division time-series data has a highest similarity degree; and
   for each of the plurality of division time-series data of which the state has been classified as anomalous, determining, by the processor, that the manufacturing facility is in an anomalous state in a corresponding time width,
   wherein division of the time-series data to generate the plurality of division time-series data provides for increased accuracy in detecting that the manufacturing facility is in the anomalous state.

2. The time-series data processing method according to claim 1, further comprising:
   assigning, by the processor, a new label to each of the plurality of the division time-series data in accordance with the classified state of the division time-series data.

3. The time-series data processing method according to claim 2, further comprising:
   generating, by the processor, a new generator to generate the state, based on the new label assigned to each of the plurality of the division time-series data.

4. The time-series data processing method according to claim 3, further comprising:
   generating, by the processor using the new generator, the state of each of a plurality of other time-series data as anomalous or non-anomalous; and
   controlling, by the processor, output of output information based on the state of each of the plurality of the other division time-series data.

5. The time-series data processing method according to claim 4, further comprising:
   outputting, by the processor, the output information including the new label based on the of each of the plurality of the other division time-series data.

6. The time-series data processing method according to claim 5, further comprising:
   generating, by the processor using the new generator, the state of each of the plurality of the division time-series data;
   storing, by the processor, the state of each of the plurality of the division time-series data and the new label assigned to each of the plurality of the division time-series data in association with each other; and
   outputting, by the processor, the output information including the new label associated with the state of each of the plurality of the division time-series data, based on the state of each of the plurality of the other division time-series data and the stored state of each of the plurality of the division time-series data.

7. The time-series data processing method according to claim 4, further comprising:
   setting, by the processor, a predetermined section of the plurality of the time-series data based on a result of analysis of the plurality of the time-series data; and generating, by the processor, the generator in accordance with the label assigned to the each of the plurality of the time-series data.

8. The time-series data processing method according to claim 3, further comprising:
generating, by the processor and for the new label, the new generator so as to generate the state in correspondence with content of the plurality of division time-series data given the new label.

9. The time-series data processing method according to claim 1, comprising
generating, by the processor and for the specified label, the generator so as to generate the state in correspondence with content of the division time-series data given the specified label.

10. A time-series data processing apparatus comprising:
at least one memory configured to store instructions; and
at least one processor configured to execute the instructions to:
identify a predetermined time width in which the time-series data matches a specified label;
divide the time-series data in the predetermined time width in which the time-series data matches the specified label by a shorter time width than the predetermined time width to generate a plurality of division time-series data;
classify, by using a generator, a state of each of the plurality of division time-series data as anomalous or non-anomalous, by:
calculating a similarity degree between each of the division time-series data and each a plurality of pre-classified division time series data;
assigning the state of each of the division time-series data as anomalous or non-anomalous in accordance with the pre-classified division time series with which the each of the division time-series data has a highest similarity degree; and
for each of the plurality of division time-series data of which the state has been classified as anomalous, determine that the manufacturing facility is in an anomalous state in a corresponding time width,
wherein division of the time-series data to generate the plurality of division time-series data provides for increased accuracy in detecting that the manufacturing facility is in the anomalous state.

11. The time-series data processing apparatus according to claim 10, wherein the at least one processor is configured to execute the instructions to further:
assign a new label to each of the plurality of the division time-series data in accordance with the classified state of the division time-series data.

12. The time-series data processing apparatus according to claim 11, wherein the at least one processor is configured to execute the instructions to further:
generate a new generator to generate the state, based on the new label assigned to each of the plurality of the division time-series data.

13. The time-series data processing apparatus according to claim 12, wherein the at least one processor is configured to execute the instructions to further:
generate, by using the new generator, the state of each of a plurality of other time-series data as anomalous or non-anomalous; and control output of output information based on the state of each of the plurality of the other division time-series data.

14. The time-series data processing method according to claim 13, wherein the at least one processor is configured to execute the instructions to further:
output the output information including the new label based on the of each of the plurality of the other division time-series data.

15. The time-series data processing apparatus according to claim 14, wherein the at least one processor is configured to execute the instructions to further:
generate the state of each of the plurality of the division time-series data;
store the state of each of the plurality of the division time-series data and the new label assigned to each of the plurality of the division time-series data in association with each other; and
output the output information including the new label associated with the state of each of the plurality of the division time-series data, based on the state of each of the plurality of the other division time-series data and the stored state of each of the plurality of the division time-series data.

16. The time-series data processing apparatus according to claim 13, wherein the at least one processor is configured to execute the instructions to further:
set a predetermined section of the plurality of the time-series data based on a result of analysis of the plurality of the time-series data; and
generate the generator in accordance with the label given assigned to the each of the plurality of the time-series data.

17. A non-transitory computer-readable storage medium storing a program executable by an information processing apparatus to:
identify a predetermined time width in which the time-series data matches a specified label;
divide the time-series data in the predetermined time width in which the time-series data matches the specified label by a shorter time width than the predetermined time width to generate a plurality of division time-series data;
classify, by using a generator, a state of each of the plurality of division time-series data as anomalous or non-anomalous, by:
calculating a similarity degree between each of the division time-series data and each a plurality of pre-classified division time series data;
assigning the state of each of the division time-series data as anomalous or non-anomalous in accordance with the pre-classified division time series with which the each of the division time-series data has a highest similarity degree; and
for each of the plurality of division time-series data of which the state has been classified as anomalous, determine that the manufacturing facility is in an anomalous state in a corresponding time width,
wherein division of the time-series data to generate the plurality of division time-seris data provides for increased accuracy in detecting that the manufacturing facility is in the anomalous state.

* * * * *